United States Patent

Ash et al.

[11] Patent Number: 5,929,203
[45] Date of Patent: Jul. 27, 1999

[54] PROCESS FOR PREPARING HIGH MOLECULAR WEIGHT POLY(ARYLENE SULFIDE) POLYMERS USING LITHIUM SALTS

[75] Inventors: Carlton E. Ash, Sugarland, Tex.; Jon F. Geibel; Harold D. Yelton, both of Bartlesville, Okla.

[73] Assignee: Phillips Petroleum Company, Bartlesville, Okla.

[21] Appl. No.: 07/965,647

[22] Filed: Oct. 23, 1992

[51] Int. Cl.⁶ .................................................. C08G 75/14

[52] U.S. Cl. ........................ 528/388; 528/374; 528/381; 528/389; 528/390

[58] Field of Search ................................... 528/388, 374, 528/381, 389, 390

[56] References Cited

U.S. PATENT DOCUMENTS

| | | | |
|---|---|---|---|
| 3,919,177 | 11/1975 | Campbell | 528/373 |
| 4,500,702 | 2/1985 | Ostlinning et al. | 528/388 |
| 4,794,164 | 12/1988 | Iwasaki et al. | 528/388 |
| 5,110,901 | 5/1992 | Hoover et al. | 528/387 |

*Primary Examiner*—Terressa Mosley
*Attorney, Agent, or Firm*—Beverly M. Dollar

[57] ABSTRACT

A process is provided for producing a high molecular weight poly(arylene sulfide) polymer employing at least one dihaloaromatic compound, a sulfur source, a polar organic compound, a lithium salt which is soluble in the polar organic compound, and water in an amount less than about 1.75 moles of water per mole of sulfur under polymerization conditions. The pressure and temperature are chosen to allow the volatile reactants to be maintained in liquid form in the reaction mixture.

9 Claims, No Drawings

PROCESS FOR PREPARING HIGH MOLECULAR WEIGHT POLY(ARYLENE SULFIDE) POLYMERS USING LITHIUM SALTS

FIELD OF THE INVENTION

This invention relates to poly(arylene sulfide), (PAS) polymers. In one aspect this invention relates to a process for the preparation of high molecular weight poly(arylene sulfide) polymers.

BACKGROUND OF THE INVENTION

Poly(arylene sulfide) polymers are generally known in the art, and are suitable for many applications due to their high temperature and chemical resistance, good electrical properties and inherent flame retardancy. For certain applications it is desired that the poly(arylene sulfide) polymer be of relatively high molecular weight. While processes are known for the preparation of relatively high molecular weight polymers, it is generally difficult to polymerize to very high molecular weight without using much longer polymerization times. It would be desirable to have a process for directly polymerizing a poly(arylene sulfide) to a high molecular weight without employing extremely long polymerization times.

SUMMARY OF THE INVENTION

In accordance with this invention, it has been discovered that poly(arylene sulfide) polymers of high molecular weight can be directly polymerized by contacting reactants comprising a sulfur source, a polar organic compound, a lithium salt which is soluble in the polar organic compound, dihaloaromatic compound, and water in an amount no greater than 1.75 moles of water per mole of sulfur source, under polymerization conditions with temperature and pressure chosen to insure that volatile reactants contained in the reaction mixture are maintained in liquid form in the polymerization reactor.

DETAILED DESCRIPTION OF THE INVENTION

The poly(arylene sulfide) polymer is prepared according to this invention by contacting a polymerization reaction mixture comprising at least one dihaloaromatic compound, a sulfur source, and a polar organic compound with a lithium salt that is soluble in said polar organic compound under suitable polymerization conditions.

Dihaloaromatic compounds which can be employed in the process of this invention can be represented by the formula

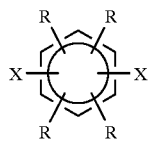

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24. While the halogen atoms can be in any position in the dihaloaromatic compound, it is preferred to employ p-dihalobenzenes as the dihaloaromatic compound.

Examples of suitable p-dihalobenzenes include p-dichlorobenzene (DCB), p-dibromobenzene, p-diiodobenzene, 1-chloro-4-bromobenzene, 1-chloro-4-iodobenzene, 1-bromo-4-iodobenzene, 2,5-dichlorotoluene. 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromo-benzene, 1-hexyl-3-dodecyl-2,5-dichlorobenzene, 1-octadecyl-2,5-diiodobenzene, 1-phenyl-2-chloro-5-bromobenzene, 1-(p-tolyl)-2,5-dibromobenzene, 1-benzyl-2,5-dichlorobenzene, 1-octyl-4-(3-methylcyclopentyl)-2,5-dichloro-benzene and the like, and mixtures of any two or more thereof. The preferred dihaloaromatic compound for use in this invention is p-dichlorobenzene (DCB) due to availability and effectiveness.

Any suitable sulfur source can be employed in the process of this invention. Suitable sulfur sources are disclosed in U.S. Pat. No. 3,919,177, which is hereby incorporated by reference. Such suitable sulfur sources include, but are not limited to thiosulfates, thioureas, thioamides, elemental sulfur, thiocarbamates, metal disulfides and oxysulfides, thiocarbonates, organic mercaptans, organic mercaptides, organic sulfides, alkali metal sulfides and bisulfides and hydrogen sulfide. It is presently preferred to use an alkali metal sulfide as the sulfur source.

Alkali metal sulfides which can be employed in the process of this invention include lithium sulfide, sodium sulfide, potassium sulfide, rubidium sulfide, cesium sulfide, and mixtures thereof. Preferably, the alkali metal sulfide is used as a hydrate or as an aqueous mixture. If desired, the alkali metal sulfide can be prepared as an aqueous solution by the reaction of an alkali metal hydroxide with an alkali metal bisulfide in aqueous solution. It is preferred to use sodium sulfide or a combination of sodium bisulfide and sodium hydroxide as the sulfur source in this invention.

The polar organic compounds useful in the present invention are solvents for the dihaloaromatic compounds and the sulfur source used in the production of poly(arylene sulfide) polymers. Examples of such polar organic compounds include amides, including lactams, and sulfones. Specific examples of such polar organic compounds include hexamethylphosphoramide, tetramethylurea, N,N'-ethylenedipyrrolidone, N-methyl-2-pyrrolidone (NMP), pyrrolidone, caprolactam, N-ethylcaprolactam, sulfolane, N,N'-dimethylacetamide, 1,3-dimethyl-2-imidazolidinone, low molecular weight polyamides, and the like. The polar organic compound presently preferred is NMP.

The lithium salts useful in this invention are those which are soluble in the polar organic compound. Suitable lithium salts include lithium halides and carboxylates. Preferred lithium salts are lithium acetate, lithium benzoate and lithium chloride, due to availability and the good results obtained through their use.

The poly(arylene sulfide) polymer prepared by the invention method is characterized as high molecular weight polymer. The term "high molecular weight poly(arylene sulfide) polymer", as used herein, is generally meant to denote an essentially linear poly(arylene sulfide) polymer having a melt flow value less than about 1000 g/10 min when in an uncured state. "Essentially linear poly(arylene sulfide)", as used herein, is defined as a polymer having no branching or such a small amount of branching as to have substantially no effect on the polymer properties. For example, the amount of polyhaloaromatic compound impurity found in the dihaloaromatic compound used in the poly(arylene sulfide) polymerization process would not be sufficient to cause the resultant poly(arylene sulfide) to be outside the essentially linear definition).

The poly(arylene sulfide) polymers prepared according to the invention process generally exhibit melt flow values (rates) in the range of 2–700 g/10 min. Polymers having melt flows in the range of 2–50 g/10 min. have been prepared by a preferred embodiment of the invention method.

Generally, the ratio of reactants employed in the polymerization process can vary widely. It is preferred that the molar ratio of the amount of dihaloaromatic compound to amount of sulfur source be in the range of about 0.8/1 to about 2/1. The molar ratio of lithium salt to dihaloaromatic compound be within the range of about 0.05/1 to about 4/1, preferably 0.1/1 to 2/1.

The amount of polar organic compound employed can vary during the polymerization over a wide range. Preferably, however, during polymerization the molar ratio of the amount of polar organic compound to the range of sulfur source is in the range of 1/1 to 10/1.

The components of the reaction mixture can be contacted with each other in any order. If the reactants contain a significant amount of water, the reaction mixture should be dehydrated under conditions sufficient to remove all but about 1.75 mole of water per mole of sulfur in the sulfur source prior to addition of the dihaloaromatic compound and commencement of the polymerization. It is presently preferred that the amount of water be limited to an amount within the range of about about 1.1 moles of water per mole of sulfur in the sulfur source since this amount of water can be achieved through available and economical process steps and has been shown to give good results.

The term commencement of the polymerization as used herein is defined as that point at which the polymerization reaction mixture is first subjected to polymerization conditions sufficient to initiate polymerization. The term termination of polymerization, as used herein, is defined as that point at which an affirmative step is taken to effect a removal of the conditions necessary for polymerization to effectively continue, for example, by beginning the recovery of the poly(arylene sulfide) polymer from the polymerization mixture. It must be noted that use of the term termination of the polymerization does not imply that complete reaction of the polymerization reaction components has occurred. It should also be noted that, as used herein, the term termination of the polymerization is not meant to imply that no further polymerization of the reactants can take place. Generally, for economic reasons, poly(arylene sulfide) polymer recovery is typically begun at a time when polymerization is substantially completed, that is, the increase in polymer molecular weight which would result from further polymerization is not significant enough to warrant the additional polymerization time.

Although the reaction temperature at which the polymerization is conducted can vary over a wide range, generally it will be within the range of about 170° C. (347° F.) to about 325° C. (617° F.). The reaction time can vary widely, depending in part on the reaction temperature, but generally will be within the range of about 10 minutes to about 72 hours. Higher molecular weight polymer is generally prepared through use of longer polymerization times at lower temperatures during the initial portion of the polymerization. For example, it is presently preferred to employ a polymerization temperature in the range of about 180–240° C. with a polymerization time period in the range of 3 hours to 24 hours in order to produce the high molecular weight poly(arylene sulfide) polymer.

In a presently preferred embodiment the pressure and temperature are chosen to allow reflux conditions to occur during the polymerization. By "reflux" it is meant that a continuous cycle of vaporization and condensation occurs such that volatile components are returned to the heated polymerization reaction mixture. While not wishing to be bound by theory, it is believed that in this mode of operation, the volatile components in the reaction mixture can participate more readily in the reaction. Preferably, the reactor is employed with relatively hotter and cooler sections to allow the reflux to occur. In this embodiment, the pressure should be chosen to be low enough to allow reflux to occur at the chosen temperature.

The poly(arylene sulfide) polymer prepared according to this invention can be recovered by any method known to those of ordinary skill in the art.

The following examples are provided in order to further illustrate the invention, but are not intended to be limiting of the scope thereof.

EXAMPLES

In the following examples, the polyphenylene sulfide (PPS) melt flow rates were generally determined by the method of ASTM D 1238-86, Procedure B-Automatically Timed Flow Rate Procedure, Condition 316/5.0 modified to use a 5 minute preheat time, with the values of melt flow (hereinafter referred to as MF or flow rate) expressed as grams per ten minutes (g/10 min). In Example XV, very low molecular weight PPS products required different conditions (Condition 316/0.345 with an orifice with a 2.096+/−0.005 mm diameter and a 31.75+/−0.05 mm length) for the extrusion rate determinations.

Polymer molecular weight determinations were done on a specially constructed high temperature gel permeation chromatography instrument utilizing a flame ionization detector. Determinations were carried out in 1-chloronaphthalene at 220° C. Results are reported in terms of the weight average molecular weight (Mw) in units of grams per mole (g/mol) and are based on polystyrene standards.

The polymer thermal transitions were determined on Perkin-Elmer DSC-7 equipped with a data station. Polymer glass transition (Tg), crystallization from the cold (Tcc), crystallization from the melt (Tmc), and melting point (Tm) temperatures were determined in nitrogen with a heating rate (cooling rate for Tmc) of 20° C./min. The Tmc scans were performed by cooling at 20° C./min after a 5 minute hold time at 320° C.

Example I

This example is an invention run that demonstrates a polyphenylene sulfide (PPS) polymerization using a lithium salt, dehydration to remove all but about one mole or less of the initial water per mole of sulfur compound, and internal volatiles condensation.

A one-liter, titanium reactor supplied by Autoclave Engineers and equipped with an anchor stirrer was charged with 0.50 g-mol sodium hydrosulfide (NaSH) as an aqueous mixture containing 58.83 wt % NaSH, 0.505 g-mol sodium hydroxide (NaOH), 0.30 g-mol lithium benzoate (LiOBz), and 1.50 g-mol N-methyl-2-pyrrolidone (NMP). This mixture contained a LiOBz/sulfur compound mole ratio of 0.60. The 1-L reactor was heated with an electric heating mantle. The mantle covered the body of the reactor up to a point such that the top of the mantle was 62 mm from the base of the reactor lid. When the reactor bead temperature is reported, the thermocouple was located in the reactor thermowell to a point just below the reactor lid.

The reactor was closed, pressured up to about 200 psig with nitrogen and vented three times while stirring, and heated for dehydration. When the temperature reached 157° C., the dehydration vent line was opened and the dehydration was carried out for 50 minutes to a final temperature of 209° C.

The dehydration step removed 21.21 g of liquid and a gas phase chromatographic analysis of the liquid showed that it contained 4.96 wt % NMP and 95.04 wt % water. The amount of water removed during dehydration was subtracted from the total amount of water available, that charged to the reactor and that to be generated during the polymerization process. All but 0.465 g-mol (0.93 mole water/mole sulfur compound) of the total water had been removed.

After the termination of the dehydration, 0.505 g-mol p-dichlorobenzene (DCB) and 0.25 g-mol NMP were charged to the reactor. The total amount of NMP charged for the dehydration and polymerization was 1.75 g-mol for a mole ratio of NMP/sulfur compound of 3.5/1. Polymerization was carried out by heating the mixture to 235° C. and holding for one hour followed by heating to 265° C. and holding for three hours. The reactor pressure during the 235° C. hold was about 210 kPa and was about 580 kPa during the 265° C. hold. Although the head temperature was not determined during this polymerization, in a later, essentially identical run, the head temperature at the end of the 235° C. hold was 105° C., and the head temperature at the end of the 265° C. hold was 153° C. It is believed, based on observations made during the polymerization runs, and the use of lower pressures, that these conditions resulted in reflux conditions in the reactor.

After the reactor had cooled, the contents were removed, combined with an equal quantity of deionized water and filtered on a 200 mesh screen. The polymer collected on the screen was washed with hot (85° C.) deionized water. After the polymer had been dried in a vacuum oven at 100° C., the product had a flow rate of 30 g/10 min and was recovered in a yield of 89 mol %, based on the molar amount of NaSH charged.

This example shows that PPS can be produced with a flow rate below 50 g/10 min with the polymerization conditions of the present invention, including a lithium salt modifier, dehydration to remove all but about 1 mole of water per mole of sulfur compound, reflux conditions in the polymerization, and suitable polymerization conditions.

Example II

Several additional PPS polymerizations were carried out to further demonstrate the process of this invention. Variations in polymerization time and temperature were utilized for the runs of this example.

The polymerization equipment and procedures are the essentially the same as described in Example I, except for the changes noted here and in the summary table. Run 10 was dehydrated to a lower temperature than the other runs and less water was removed. Runs 11 and 12 were done with 0.51 g-mol NaOH and 0.50 g-mol DCB.

The results of the polymerization runs are summarized in Table I. Run 1 from Example I is included for comparison. In this and later tables, the columns list the final temperature during dehydration, total water/sulfur compound mole ratio after dehydration, polymerization conditions in terms of time and temperature, the polymerization pressure at the start of the initial polymerization hold, and the final pressure before cooling was began. Where only one hold temperature was used, the value given is for the end of the hold. Due to occasional temperature fluctuations near the end of the dehydration, the final dehydration temperature was less useful as a control parameter compared to the total volume of liquid distilled.

Polymers 1 through 6 had flow rates below 50 g/10 min. Polymerization conditions in runs 7 through 9 resulted in flow rates above 50 g/10 min. Polymer 10 had a flow rate of 119 g/10 min as a result of the reduced amount of water removed during the dehydration step. The polymers produced in runs 11 and 12 demonstrate that relatively low flow rate PPS (244 and 111 g/10 min) can be produced with very short polymerization times (one hour) using the process of the present invention.

TABLE I

PPS Polymerizations

| | | | Polymerization Conditions | | | |
|---|---|---|---|---|---|---|
| Run | Maximum Dehydration Temp° C. | $H_2O$/S Mole Ratio | Time/Temp., hr/° C. | Pressure, kPa Initial | Final | Flow Rate, g/10 min |
| 1 | 209 | 0.93 | 1/235; 3/265 | 210 | 580 | 30 |
| 2 | 210 | 0.90 | 2/235; 2/265 | 140 | 450 | 30 |
| 3 | 212 | 0.95 | 3/235; 2/265 | 210 | 580 | 32 |
| 4 | 210 | 0.95 | 1/210; 1/235; 2/265 | 100 | 550 | 32 |
| 5 | 212 | 0.89 | 1/235; 2/265 | 210 | 580 | 34 |
| 6 | 221 | 0.88 | 1/235; 6/265 | 240 | 450 | 38 |
| 7 | 213 | 0.98 | 2/235; 1/265 | 210 | 620 | 54 |
| 8 | 209 | 0.99 | 1/235; 1/265 | 210 | 580 | 77 |
| 9 | 213 | 0.88 | 3/235 | — | 380 | 117 |
| 10 | 204 | 1.47 | 1/235; 5/265 | 340 | 760 | 119 |
| 11 | 219 | 1.07 | 1/265 | — | 520 | 244 |
| 12 | 220 | 1.02 | 1/275 | — | 620 | 111 |

Example III

Additional PPS polymerizations were carried out to demonstrate that even lower flow rate polymers than described in Example II can be produced by extended low temperature polymerization conditions.

The procedure described in Example I was followed except for the polymerization conditions. In run 13, the polymerization was carried out for six hours at 210° C. and then for six hours at 265° C. In run 14, the polymerization conditions were six hours at 210° C. and two hours at 265° C.

The results of these extended time polymerizations are shown in Table II. Run 1 from Example I is included for comparison. The very low flow rates of 15 and 18 g/10 min for polymers 13 and 14, 89 and 90 mol % yields respectively, demonstrate the high molecular weights possible with the PPS polymerization system of the present invention and extended low temperature polymerization times. GPC analysis of polymer 14 showed that it had a weight average molecular weight of 94,000 g/mol, which is considerably higher than the 58,000 g/mol for a 137 g/10 min flow rate comparative PPS made as described in Example I with a sodium acetate modifier instead of lithium benzoate.

TABLE II

PPS Polymerizations

| Run | Dehydration °C. | H₂O/S Mole Ratio | Time/Temp., hr/°C. | Pressure, kPa Initial | Pressure, kPa Final | Flow Rate, g/10 min |
|---|---|---|---|---|---|---|
| 1  | 209 | 0.93 | 1/235; 3/265 | 210 | 580 | 30 |
| 13 | 209 | 0.93 | 6/210; 6/265 | 140 | 520 | 15 |
| 14 | 205 | 0.88 | 6/210; 2/265 | 140 | 520 | 18 |

Example IV

PPS polymerizations were carried out according to the process of the present invention on a larger scale. The reactor was a 7.6 L, titanium reactor supplied by Autoclave Engineers and equipped with an anchor stirrer.

Invention polymer 15 was prepared by charging the reactor with 4.0 g-mol NaSH as an aqueous mixture containing 59.149 wt % NaSH, 4.04 g-mol NaOH, 2.4 g-mol LiOBz, and 12.0 g-mol NMP. This mixture contained a LiOBz/sulfur compound mole ratio of 0.60. The reactor was heated with an electric heating mantle and the top of the mantle was positioned about 160 mm from the reactor lid to avoid heating the reactor head.

The reactor was closed, purged with nitrogen while stirring as described in Example I, and heated for dehydration. When the temperature reached 152° C., the dehydration vent line was opened and the dehydration was carried out for 70 minutes to a final temperature of 215° C.

The dehydration step removed 182.9 g of liquid and a gas chromatographic analysis of the liquid showed that it contained 87.73 wt % water. From the total amount of water available, that charged to the reactor and that to be generated during the polymerization process, was subtracted that amount of water removed in the dehydration, all but 3.76 g-mol (0.94 mole water/mole sulfur compound) of the total water had been removed in the dehydration step.

After the termination of the dehydration, 3.96 g-mol DCB and 2.0 g-mol NMP were charged to the reactor. The total amount of NMP charged for the dehydration and polymerization was 14.0 g-mol for a mole ratio of NMP/sulfur compound of 3.5. Polymerization was carried out by heating the mixture to 235° C. and holding for one hour followed by heating to 265° C. and holding for three hours. The pressure during the 235° C. hold was about 170 kPa and during the 265° C. hold was about 720 kPa. The head temperatures during the two polymerization holds were 120° C. in the first hold and 165° C. in the second. These polymerization temperatures and pressures resulted in reflux conditions during the polymerization.

After the reactor had cooled, the product was removed and filtered on a 200 mesh screen. The polymer collected on the screen was washed with hot, deionized water and dried in an air oven at 125° C. Polymer 15 bad a flow rate of 30 g/10 min and was recovered in a yield of 89 mole % based on the amount of DCB charged.

Polymerization run 16 was carried out in essentially the same manner as run 15, except the DCB charged was 3.92 g-mol. Control run 17 was modified with the reactor heater raised 70 mm closer to the reactor head and extra nitrogen added with the DCB charge such that the pressure at the start of the 235° C. hold was 450 kPa. The addition of N₂ pressure and heat supplied higher on the reactor resulted in a reduction or elimination of the reflux during the polymerization as manifested in a lower head temperature of 148° C. in the high temperature polymerization hold compared to 165° C. in run 15.

The results of the three polymerizations are summarized in Table III. Runs 15 and 16 with a reflux have flow rates below 50 g/10 min, while control run 17 without a reflux had a flow rate of 66 g/10 min.

TABLE III

PPS Polymerizations

| Run | H₂O/S Mole Ratio | Pressure, kPa Initial | Pressure, kPa Final | Head Temp., °C. Initial | Head Temp., °C. Final | Flow Rate, g/10 min. |
|---|---|---|---|---|---|---|
| 15 | 0.94 | 170 | 720 | 120 | 165 | 30 |
| 16 | 0.94 | 170 | 760 | a | a | 38 |
| 17 | 0.96 | 450 | 930 | 115 | 148 | 66 |

ªNot determined.

Example V

Several PPS samples were prepared as described for polymers 15 and 16 in Example IV and these samples were combined to form polymer 18 (flow rate=35 g/10 min) for further evaluation. For comparison, a linear PPS sample (flow rate=170 g/10 min) produced with a sodium acetate modifier obtained from Phillips Petroleum Co. as Ryton® PPS PR-10, designated polymer 19, was used.

The flow rates, GPC molecular weights, and DSC thermal properties of the two polymers are shown in Table IV. Invention polymer 18 has a much lower flow rate and higher molecular weight than control polymer 19. The DSC thermal properties are similar, except for the higher Tmc value of polymer 18.

TABLE IV

Polymer Properties

| Polymer | 18 | 19 |
|---|---|---|
| Flow Rate, g/10 min | 35 | 170 |
| GPC Molecular Weight Mw, g/mol | 72,000 | 47,000 |
| Thermal Properties | | |
| Tg, °C. | 95 | 94 |
| Tcc, °C. | 146 | 149 |
| Tmc, °C. | 214 | 193 |
| Tm (as powder), °C. | 286 | 278 |
| Tm (quenched), °C. | 273 | 273 |

Example VI

This example compares lithium benzoate with sodium benzoate as modifiers for the preparation of PPS with flow rates below 50 g/10 min. Polymerization 20 was carried out in a manner similar to that described in run 1 in Example I, except for the use of 0.30 g-mol sodium benzoate (NaOBz) as the polymerization modifier. The dehydration step did not remove as much water as in run 1, although essentially the same dehydration conditions were used.

The PPS product of run 20, shown in Table V with run 1 for comparison, had a flow rate of 100 g/10 min.

TABLE V

PPS Polymerizations

| Run | Dehydration °C. | H₂O/S Mole Ratio | Modifier | Polymerization Pressure, kPa Initial | Polymerization Pressure, kPa Final | Flow Rate, g/10 min |
|---|---|---|---|---|---|---|
| 1 | 209 | 0.93 | LiOBz | 210 | 580 | 30 |
| 20 | 220 | 1.19 | NaOBz | 280 | 690 | 100 |

Example VII

This example demonstrates the effect of different lithium benzoate levels on the PPS polymerization. Four runs were carried out as described in run 1 of Example I, except for varying amounts of the modifier.

The results of these polymerization runs are shown in Table VI. Polymer 1 from Example I is included for comparison. The flow rates of the lowest modifier level (0.30 moles of LiOBz/mole of sulfur compound) are above 50 g/10 min, indicating that the lower modifier levels are not sufficient to achieve the preferred lower flow rates using the chosen reaction temperatures and times.

TABLE VI

PPS Polymerizations

| Run | LiOBz/S Mole Ratio | Dehydration, °C. | H₂O/S Mole Ratio | Polymerization Pressure, kPa Initial | Polymerization Pressure, kPa Final | Flow Rate, g/10 min |
|---|---|---|---|---|---|---|
| 1 | 0.60 | 209 | 0.93 | 210 | 580 | 30 |
| 21 | 1.00 | 214 | 1.09 | 280 | 620 | 34 |
| 22 | 0.30 | 206 | 1.02 | 170 | 650 | 97 |
| 23 | 0.30 | 213 | 1.11 | 210 | 520 | 101 |
| 24 | 0.30 | 214 | 1.14 | 210 | 480 | 127 |

Example VIII

The effect of the water level in the dehydrated mixture on the kinetics of the PPS polymerization is demonstrated in this example. Small scale polymerizations were performed in glass reactors.

Each glass reactor was charged with anhydrous sodium sulfide, DCB, NMP and water to represent mixtures after a dehydration step. Quantities of each chemical are expressed here in terms of a mole ratio to the amount of anhydrous sodium sulfide. Each reaction mixture contained 1.00 anhydrous sodium sulfide, 1.01 DCB, 3.5 NMP, and either 1.00, 2.00, or 3.00 water.

The reactors were degassed twice by freezing the contents of each reactor in liquid nitrogen and evacuating the headspace of the reactor. The glass reactors were heated to 235° C. at 1.4° C./min and held for 15, 35, or 65 minutes.

The reactors were then allowed to cool quickly. They were then opened and analyzed for unreacted DCB by gas chromatography. As shown in FIG. 1, which plots the DCB conversion against polymerization time, higher levels of water result in reduced DCB conversions.

Example IX

The effect of the water/sulfur compound mole ratio after dehydration on the PPS product melt flow is shown in this example. PPS polymerization runs 25 and 10 (from Example II) were carried out as described in run 1, except that the dehydrations removed less water resulting in water to sulfur compound mole ratios of 1.48 and 1.47 compared with a ratio of 0.93 for run 1. Run 10 was carried out with a 265° C. hold time of 5 hours.

The results of these polymerizations are shown in Table VII with run 1 included for comparison. A comparison of the flow rates of run 1 with runs 25 and 10 shows that the removal of all but about 1 mole of water per mole of sulfur compound (run 1) is important for achieving the preferred flow rates below 50. The removal of less water (runs 25 and 10) results in higher flow rate values.

TABLE VII

PPS Polymerizations

Polymerization Conditions

| Run | Dehydration °C. | H₂O/S Mole Ratio | Time/Temp., hr/°C. | Pressure, kPa Initial | Pressure, kPa Final | Flow Rate, g/10 min |
|---|---|---|---|---|---|---|
| 1 | 209 | 0.93 | 1/235; 3/265 | 210 | 580 | 30 |
| 25 | 205 | 1.48 | 1/235; 3/265 | 380 | 790 | 67 |
| 10 | 204 | 1.47 | 1/235; 5/265 | 340 | 760 | 119 |

Example X

The influence of the water level before the dehydration step on the resulting PPS is shown in this example. Runs 26 and 27 were carried out in a manner similar to that described in Example I, except that additional water was added to the mixture before dehydration. Both dehydrations were done to produce a dehydrated mixture with essentially the same levels of water as in run 1.

As shown in Table VIII, the melt flow rates of the two PPS samples were essentially the same as the polymer from comparison run 1. This indicates that variations in the water level before dehydration do not significantly influence the final polymer melt viscosities.

TABLE VIII

PPS Polymerizations

| Run | Additional Water Added Before Dehydration, Moles | Dehydration °C. | H₂O/S Mole Ratio | Polymerization Pressure, kPa Initial | Polymerization Pressure, kPa Final | Flow Rate, g/10 min |
|---|---|---|---|---|---|---|
| 1 | 0.0 | 209 | 0.93 | 210 | 580 | 30 |
| 26 | 1.0 | 218 | 0.93 | 170 | 520 | 30 |
| 27 | 2.0 | 208 | 0.85 | 170 | 550 | 29 |

Example XI

Several PPS polymerizations were carried out to determine the effect of the concentrations of the reactants (regulated by the amounts of NMP) on the product melt flow. Polymerizations 28, 29, 30, and 31 were carried out in a manner similar to that described in Example I, except for changes in the amount of NMP used. Mole ratios of NMP to sulfur compound ranged from 3.00 in run 28 to 5.0 in run 31.

As described in Table IX, the PPS melt viscosities of polymers 29, 30, and 31 are similar to each other and to polymer 1. Only polymer 28, which was prepared with the lowest level of NMP, had an increased flow rate of 89 g/10 min.

TABLE IX

PPS Polymerizations

| Run | NMP/S Mole Ratio | H$_2$O/S Mole Ratio | Flow Rate, g/10 min |
|---|---|---|---|
| 28 | 3.0 | 1.10 | 89 |
| 29 | 3.50 | 0.99 | 24 |
| 30 | 4.00 | 1.06 | 31 |
| 31 | 5.00 | 1.13 | 39 |

Example XII

Several more PPS polymerizations were done to demonstrate the effect of the amount of DCB charged to the polymerization on the products.

Each run was carried out essentially as described in Example I, except for variations in the amounts of DCB charged to the dehydrated mixture. Mole ratios of DCB to sulfur compound ranged from 0.97 in runs 32 and 33 to 1.06 in run 36.

The results of these runs (Table X) show that at the lowest DCB level, the PPS flow rates become very high, while at the highest DCB level, the flow rate increases above the preferred level of 50 g/10 min.

TABLE X

PPS Polymerizations

| Run | Dehydration, °C. | H$_2$O/S Mole Ratio | DCB/S Mole Ratio | Polymerization Pressure, kPa Initial | Final | Flow Rate, g/10 min |
|---|---|---|---|---|---|---|
| 32 | 209 | 0.88 | 0.97 | 240 | 520 | 1980 |
| 33 | 209 | 0.92 | 0.97 | 170 | 650 | [a] |
| 34 | 217 | 0.86 | 0.99 | 280 | 480 | 45 |
| 35 | 221 | 0.88 | 1.00 | 240 | 480 | 44 |
| 1 | 209 | 0.93 | 1.01 | 210 | 580 | 30 |
| 36 | 213 | 0.88 | 1.06 | 170 | 480 | 100 |

[a]Polymer degraded.

Example XIII

The importance of the reactor conditions on the reflux of a water/NMP mixture is demonstrated in this example. A 1-L, stainless steel reactor was charged with 2.52 g-mol NMP and 0.83 g-mol water. The reactor was closed, deoxygenated with nitrogen, and heated to 240° C. An empty 300 mL charge vessel was attached to a reactor side port with two ball valves between the reactor and charge vessel.

The charge vessel was pressured with 340 kPa to match the pressure in the reactor and the valves between the reactor and vessel were opened. After a minute or two, the vessel was very hot to the touch indicative of reflux behavior in the unheated charge vessel. After the valves between the reactor and vessel were closed, the vessel was removed and the contents examined. It contained 9 g of liquid that was 88% water and 12% NMP as determined by gas chromatography.

To the charge vessel was added the liquid that had been removed above and 10 g of DCB. The vessel was attached to the reactor and the connecting valves opened. The vessel again became hot and the contents of the charge vessel flowed into the reactor. Removal of the charge vessel and an examination of the contents showed that only about 0.5 g of DCB remained in the charge vessel.

After the empty charge vessel had been reattached to the reactor, both the charge vessel and reactor were pressured to about 580 kPa with nitrogen. Opening the valves between the reactor and vessel resulted in no reflux as the charge vessel remained cool for 30 minutes. Venting the pressure of the entire system down to 340 kPa resulted in heating of the charge vessel, indicating reflux conditions. Removal of the charge vessel after closing the connecting valves showed that about 2–3 g of a liquid with a water/NMP weight ratio of 89/11 and some DCB had refluxed up into the charge vessel.

The reactor was cooled to 232° C. and the charge vessel reattached to the reactor. When the valves were opened, the pressure in the system was 340 kPa. No reflux occurred under these conditions as the vessel remained cool. The reactor temperature was increased and at a reactor temperature of about 235° C., the charge vessel began to heat, indicating the start of a reflux situation. The charge vessel was removed after closing the connecting valves and the charge vessel contained about 3 g of a liquid containing a ratio of water/NMP of 83/17 with some DCB.

This example shows that the formation of reflux conditions is controlled by the reactor temperature and pressure. In this example, reflux occurred at about 340 kPa with temperatures above about 235° C., while no reflux was observed at about 580 kPa with temperatures about 240° C.

Example XIV

The effect of reactor pressure and head temperature on the PPS flow rate was determined in this example. A 1-L, titanium reactor supplied by Autoclave Engineers and equipped with an anchor stirrer was used. The polymerizations were carried out essentially as in Example I, except for the changes described below.

As shown in Table XI, the addition of excess nitrogen pressure early in the polymerization gave higher flow rates and the effect on polymer melt flow from the addition of nitrogen during polymerization decreases as the pressure was applied later in the polymerization. The times used in Table XI were determined from the start of the heating after the DCB/NMP charge. Times include 30 minutes to heat from 235° C. 265° C. Heating the reactor head with strip heaters (run 43) also increases the flow rate of the polymer compared with a run with an unheated head (run 44). Both the higher pressure and heated head prevent or decrease the effectiveness of the reflux condition in the reactor, which results in polymers with higher flow rates.

TABLE XI

PPS Polymerizations

| Run | Time N$_2$ added hr[a] | Heated Head | Flow Rate, g/10 min |
|---|---|---|---|
| 37 | 0 | No | 50 |
| 38 | 1 | No | 48 |
| 39 | 1.5 | No | 40 |
| 40 | 2.0 | No | 39 |
| 41 | 4.0 | No | 30 |
| 42 | None | No | 21[b] |
| 43 | None | Yes | 51[b] |
| 44 | None | No | 24[b] |

[a]Time during PPS polymerization step when the reactor pressure was increased to 690 kPa with nitrogen.
[b]Average of 2 runs.

Example XV

This example shows that the significant effect of reflux conditions on polymer molecular weight with a lithium modifier is unique and does not occur with another modifier or with no modifier.

A series of PPS polymerizations was carried out in a 1-L titanium autoclave. In each of the three pairs of polymerization runs one run was done at a low initial pressure and one run was done at a higher pressure for comparison. Each polymerization used the same quantities of chemicals, polymerization conditions and reactor setup as in run 1, except for those changes noted below. Runs 45 and 46 used LiOBz as a modifier and 0.51 g-mol NaOH. Runs 47 and 48 used sodium acetate and 0.515 g-mol NaOH. Runs 49 and 50 used no modifier and 0.505 g-mol NaOH. Runs 49 and 50 were heated at 265° C. for only 2 hours.

The results of the polymerizations are summarized in Table XII. Only in the LiOBz modified polymerizations is the polymer flow rate significantly changed by the higher pressures. In all three pairs of polymerizations, the head temperatures were lower for higher pressure polymerization. All three polymerizations at the lower pressure had essentially the same head temperatures and all polymerizations at the higher pressure had essentially the same head temperatures. The sodium acetate modified runs had a slightly lower flow rate for the higher pressure. When no modifier was used (runs 49 and 50), the extrusion rates (extrusion rates were measured in order to yield measurable rates) were about the same at both pressures. Lithium benzoate modified polymerizations appear to be unique in their response to the presence or absence of reflux conditions.

TABLE XII

PPS Polymerizations

| Run | Modifier | H₂O/S Mole Ratio | Polymerization Pressure, kPa Initial | Polymerization Pressure, kPa Final | Flow Rate, g/10 min | Head Temp. ° C. During Polymerization 235° | Head Temp. ° C. During Polymerization 265° |
|---|---|---|---|---|---|---|---|
| 45 | LiOBz | 0.96 | 210 | 620 | 27 | 107 | 152 |
| 46 | LiOBz | 0.99 | 1070 | 1380 | 58 | 108 | 132 |
| 47 | NaOAc | 1.28 | 210 | 760 | 193 | 110 | 165 |
| 48 | NaOAc | 1.26 | 1100 | 1480 | 180 | 110 | 137 |
| 49 | None | 1.15 | 210 | 860 | a | 110 | 167 |
| 50 | None | 1.23 | 1070 | 1380 | b | 110 | 138 |

ᵃ48 g/10 min using Condition 316/0.345, modified to use a 5 minute preheat time and a orifice with a 0.0825 ± 0.0002 in dia. and a 1.250 ± 0.002 in. length.
ᵃ49 g/10 min using Condition 316/0.345, modified to use a 5 minute preheat time and a orifice with a 0.0825 ± 0.0002 in dia. and a 1.250 ± 0.002 in. length.

Example XVI

The low flow rate PPS produced by the present invention was melt extruded into fiber to show the advantage of the higher molecular weight on fiber properties. Polymer 18 from Example V was used as the high molecular weight PPS. A portion of polymer 18 was treated with calcium acetate by the procedure described below to produce treated polymer 51. A comparative polymer 52, made with a sodium acetate modifier, was obtained from Phillips Petroleum Co. in pellet form as Ryton® PPS GRO2 having a melt flow rate of 126 g/10 min.

A 1-L, titanium autoclave was charged with 150 g of polymer 18, 500 g distilled water, and 5.2 g of calcium acetate (0.5 H₂O). The mixture was deoxygenated with nitrogen and heated to 220° C. After 30 minutes, the reactor was cooled and the polymer washed with hot water. The dried polymer 51 (110° C. in a vacuum oven) had a flow rate of 29 g/10 min.

All three polymers were converted into fiber using a piston spinning unit. Fiber extrusions for polymers 18 and 51 were done at 320° C. with a single hole die (1.02×2.54 mm), air quenching, and a takeup speed of 76 meters per minute. Control polymer 52 was extruded at 310° C. The fibers were drawn over a hot plate at 100° C. at draw ratios of 3.325×, 3.4533, and 4.1533 respectively for polymers 18, 51, and 52.

The fiber abrasion resistance was determined on an abrasion tester that consisted of a barrel shaped cage with round, stainless steel rods. The abrasion cage rotated at 100 rpm and contacted the fibers at an angle of about 90 degrees. Results are reported in terms of cycles (cage revolutions) to cause fiber failure with the values being an average of at least five tests.

The fiber properties (Table XIII) indicate that fiber from polymer 18 and the calcium acetate treated polymer 51 have significantly higher abrasion resistance than fiber from the control PPS sample 52. Both fibers prepared from invention polymer have better retention of tenacity at 90° C. than fiber from control PPS.

TABLE XIII

PPS Fiber

| Polymer | 18 | 51 | 52 |
|---|---|---|---|
| Flow Rate, g/10 min | 35 | 29 | 126 |
| Fiber | | | |
| Denier | 38 | 38 | 35 |
| Tenacity, g/den. | | | |
| At 23° C. | 3.4 | 3.5 | 3.6 |
| At 90° C. | 3.0 | 3.4 | 2.9 |
| Abrasion Resistance, cycles to break | 15,200 | 14,500 | 2,800 |

Example XVII

Injection molded parts were prepared from the high molecular weight PPS to demonstrate the benefits of the higher molecular weight PPS for injection molded parts. Invention polymer 18 from Example V was used without pelletizing. Comparative polymer 53 was prepared with a sodium acetate modifier and obtained from Phillips Petroleum Co. as Ryton® PPS PR-10, having a flow rate of 170 g/10 min. Polymer 53 was pelletized on a 38.1 mm diameter single screw extruder with a barrel temperature of 316° C.

Both samples were dried at 150° C. for 2 hours in a forced air furnace and injection molded on a New Britain injection molder with a barrel temperature of 310° C. for polymer 18 and 304° C. for polymer 53 and a mold temperature of 38° C. The molded test specimens were annealed at 200° C. for 2 hours and tested for physical properties. Results are shown in Table XIV.

TABLE XIV

Properties of Injection Molding Parts

| Polymer | 18 | 53 |
|---|---|---|
| Flexural Modulus, MPa | 3690 | 3510 |
| Flexural Strength, MPa | 158 | 136 |
| Tensile Strength, MPa | 83 | 83 |
| Elongation, % | 5.8 | 3.2 |
| Strain Energy, MPa | 3.8 | 1.9 |

TABLE XIV-continued

Properties of Injection Molding Parts

| Izod Impact Strength, J/m | | |
|---|---|---|
| Notched | 16 | 16 |
| Unnotched | 2100 | 320 |
| HDT, ° C. at 1.82 MPa | 115 | 118 |

Properties determined on the injection molded parts (Table XIV) show that parts from the higher molecular weight PPS 18 have increased elongation, strain energy, and unnotched Izod impact values compared with comparative polymer 53.

That which is claimed:

1. A process for producing a high molecular weights, essentially linear poly(arylene sulfide) polymer which comprises contacting reactants comprising
   a) at least one sulfur source,
   b) at least one dihaloaromatic compound,
   c) a polar organic compound,
   d) at least one lithium salt which is soluble in said polar organic compound, and
   e) water in an amount less than about 1.75 moles water per mole of sulfur in said sulfur source to form a reaction mixture; then subjecting said reaction mixture to polymerization conditions sufficient to form said poly (arylene sulfide) polymer, wherein said polymerization conditions include polymerization temperatures and polymerization pressures sufficient to allow reflux conditions to occur during said polymerization.

2. A process according to claim 1 wherein said lithium salt is selected from the group consisting of lithium carboxylates and lithium halides.

3. A process according to claim 2 wherein said lithium salt is lithium benzoate.

4. A process according to claim 3 wherein said lithium salt is lithium chloride.

5. A process according to claim 1 wherein the molar ratio of the amount of said dihaloaromatic compound to said sulfur source is in the range of about 0.8/1 to about 2/1.

6. A process according to claim 1 wherein the amount of lithium salt is in the range of about 0.05 to about 4 moles per mole of sulfur in said sulfur source.

7. A process according to claim 1 wherein the amount of water in the reaction mixture is in the range of about 0.65 to about 1.1 moles per mole of sulfur in said sulfur source.

8. A process according to claim 1 wherein the polymerization temperature is maintained in the range of about 180 to about 240° C. for a time period in the range of about 3 hours to 24 hours.

9. A process according to claim 1 wherein said poly(arylene sulfide) polymer is poly(phenylene sulfide).

* * * * *